Figure 1:
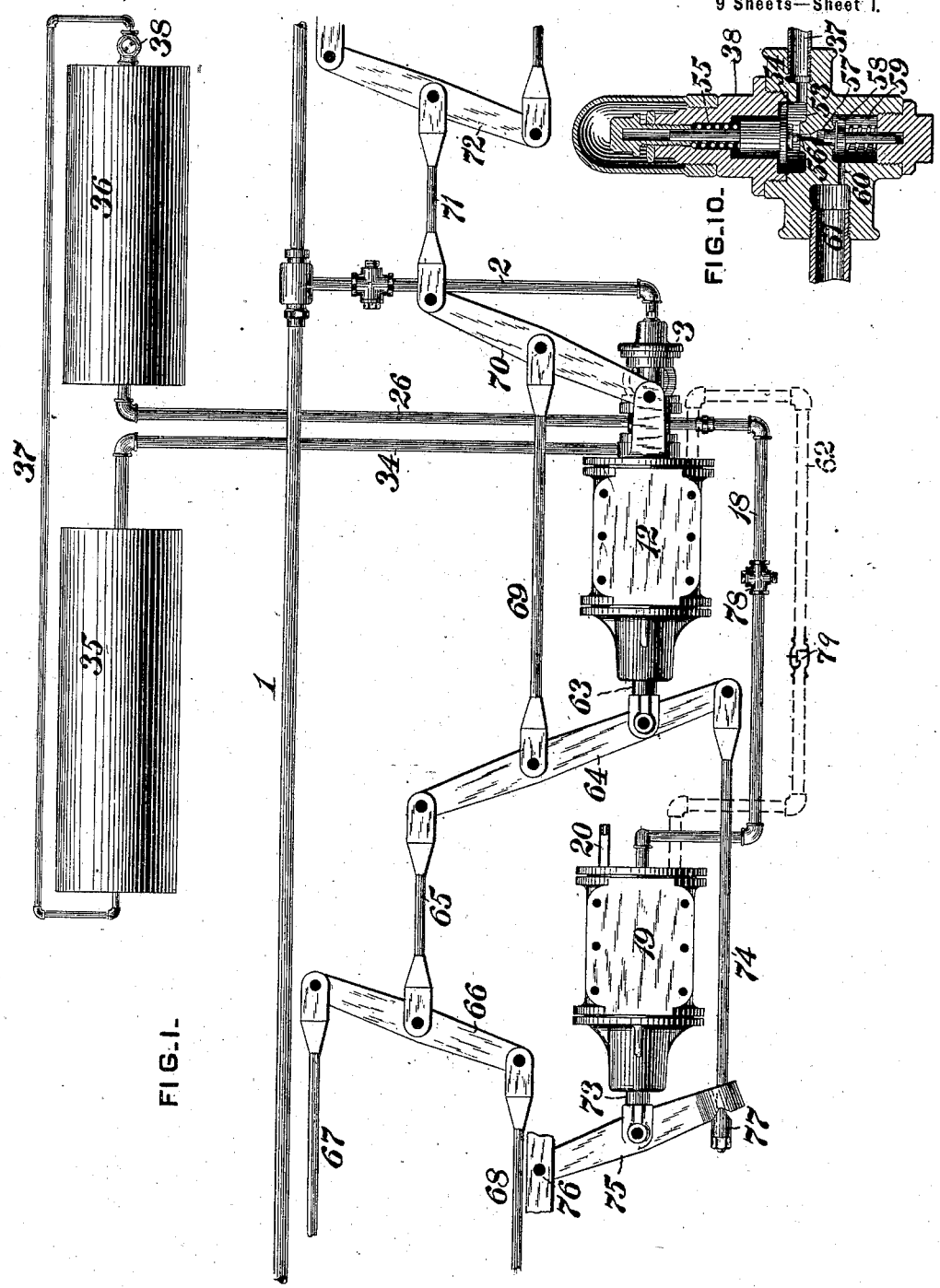

No. 702,268.  
H. H. WESTINGHOUSE.  
APPARATUS FOR APPLYING AND CONTROLLING BRAKING FORCE.  
(Application filed Nov. 14, 1892.)  
Patented June 10, 1902.

(No Model.)  
9 Sheets—Sheet 1.

WITNESSES:  
T. J. Hogan.  
F. E. Gaither.

INVENTOR,  
H. H. Westinghouse,  
by J. Snowden Bell,  
Att'y.

THE NORRIS PETERS CO., PHOTO-LITHO., WASHINGTON, D. C.

No. 702,268. Patented June 10, 1902.
H. H. WESTINGHOUSE.
APPARATUS FOR APPLYING AND CONTROLLING BRAKING FORCE.
(Application filed Nov. 14, 1892.)
(No Model.) 9 Sheets—Sheet 3.

No. 702,268. Patented June 10, 1902.
H. H. WESTINGHOUSE.
APPARATUS FOR APPLYING AND CONTROLLING BRAKING FORCE.
(Application filed Nov. 14, 1892.)
(No Model.) 9 Sheets—Sheet 4.

No. 702,268. Patented June 10, 1902.
H. H. WESTINGHOUSE.
APPARATUS FOR APPLYING AND CONTROLLING BRAKING FORCE.
(Application filed Nov. 14, 1892.)
(No Model.) 9 Sheets—Sheet 6.

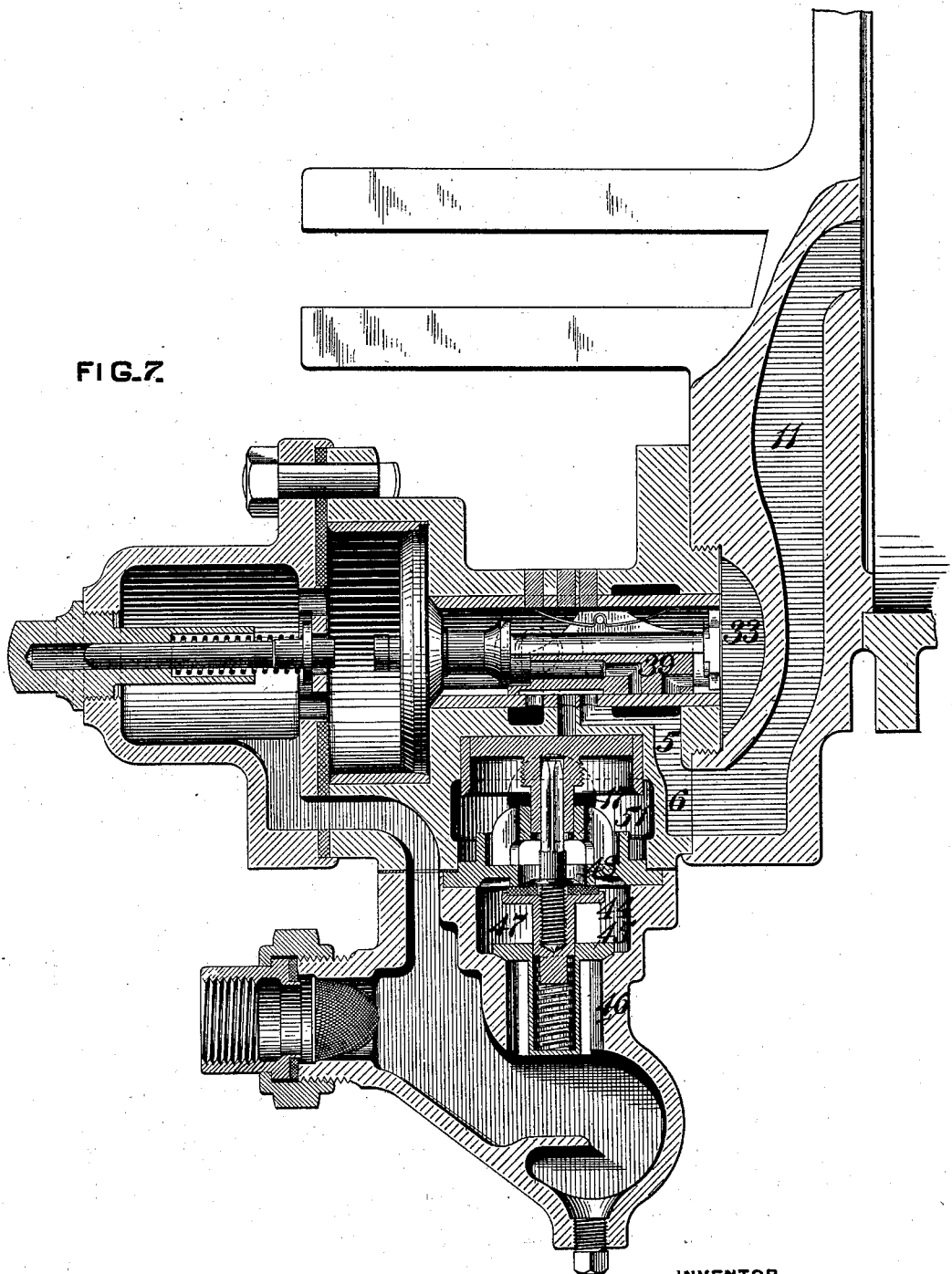

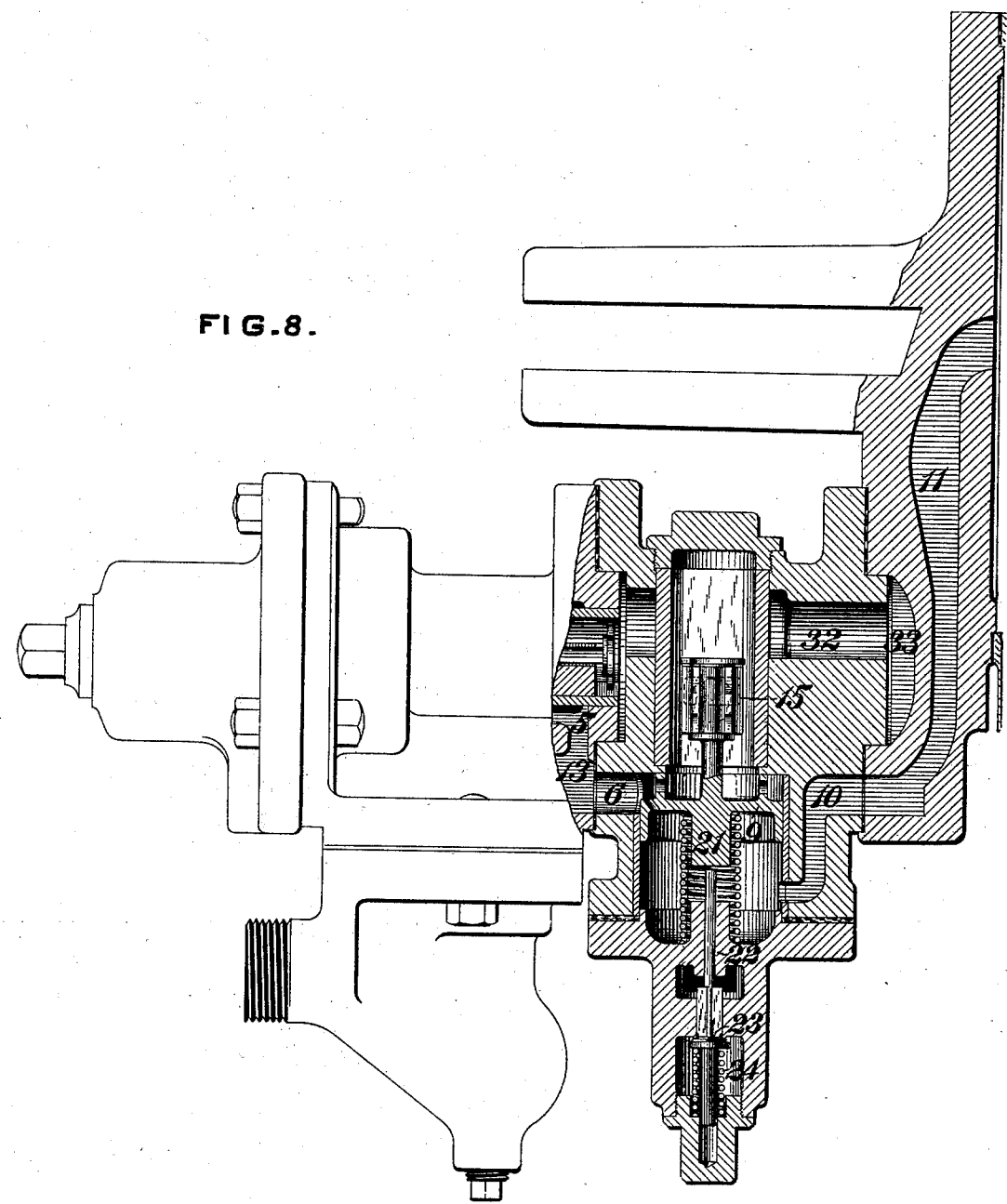

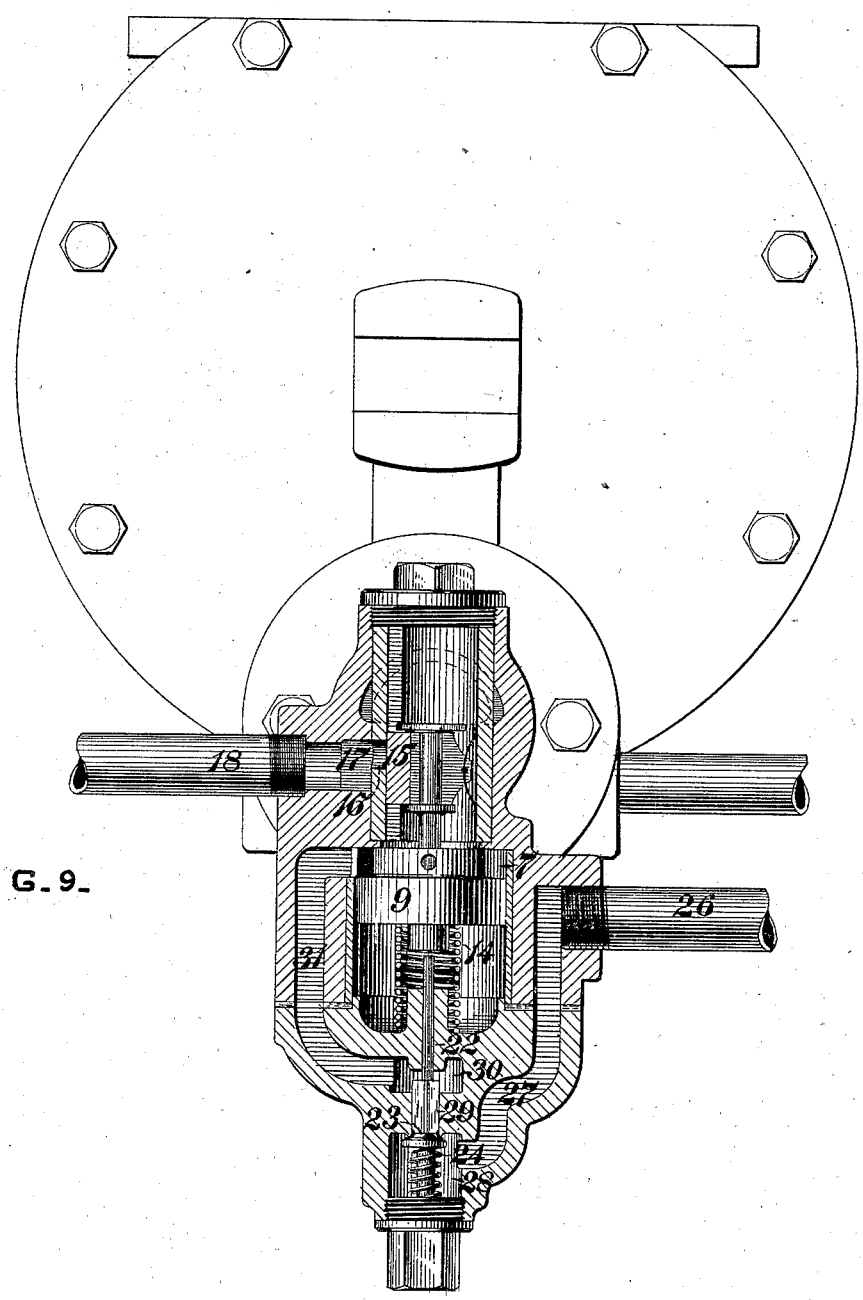

UNITED STATES PATENT OFFICE.

HENRY HERMAN WESTINGHOUSE, OF PITTSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

APPARATUS FOR APPLYING AND CONTROLLING BRAKING FORCE.

SPECIFICATION forming part of Letters Patent No. 702,268, dated June 10, 1902.

Application filed November 14, 1892. Serial No. 451,937. (No model.)

*To all whom it may concern:*

Be it known that I, HENRY HERMAN WESTINGHOUSE, a citizen of the United States, residing at Pittsburg, in the county of Allegheny and State of Pennsylvania, have invented or discovered a certain new and useful Improvement in Apparatus for Applying and Controlling Braking Force, (for which I have obtained a patent in Belgium, No. 77,864, bearing date December 29, 1892,) of which improvement the following is a specification.

The object of my invention is to provide an improved fluid-pressure system for applying and controlling the braking force of trains, particularly when running at extremely high speeds.

To this end my invention, generally stated, consists in a new and improved system for utilizing fluid-pressure for the purpose of applying controlling forces to trains, whereby such forces are rendered capable of a wide range of variation and regulation as to their amount and the time of their application; and it further consists in certain novel and improved constructions and combinations of fluid-pressure devices for the practice of said system for utilizing fluid-pressure in applying and controlling the braking forces of trains.

The improvement claimed is hereinafter fully set forth.

My invention is specially applicable in service upon railway-trains which are run at very high speed and which by reasons of their high speed and great variations of speed require a means for controlling them which is not only capable of delicate graduation and light application at comparatively low speed, but which is also capable of practically instantaneous application with very great force at high speed and which exerts its greatest force only during the time that the high speed of the train safely permits the application of such a force. To provide such a system, I employ forces additional to those which are employed in the ordinary forms of braking appliances and which are regarded as necessary therein for the purpose of making service and emergency applications of the brakes, these additional forces being brought into action only when occasion requires—that is, when the train is running at a high rate of speed and the momentum of the train and the speed of revolution of the wheels permits the application of a greater force than usual in order to check the speed of the train in the shortest possible time without sliding the wheels. Besides providing for the application of this additional force at the proper time I also provide for a gradual decrease in such force after its application in order to prevent the sliding of the wheels, which would occur if the maximum force which could be safely employed at the highest speed continued to act after the speed of the wheels had decreased.

In the embodiment of my invention as illustrated in the accompanying drawings I employ a train-pipe, auxiliary reservoir, triple valve, and brake-cylinder for the purpose of causing service applications of the brakes by comparatively moderate or slight variations of train-pipe pressure and employ in addition thereto a valve device controlling communication with one or more additional brake-cylinders and a source of fluid-pressure (which may be an auxiliary reservoir, a supplemental reservoir, or a train-pipe, or all, or any two of them) for supplying fluid under pressure to the additional brake cylinder or cylinders.

The variations of pressure in the train-pipe by which service applications of the brake are effected do not affect the operation of the extra-service valve; but when very rapid and considerable variations of train-pipe pressure are produced the extra-service valve and triple valve both operate to admit fluid under pressure from the source or sources of pressure to both or all of the brake-cylinders, and thereby effect the application of the brakes with maximum force.

In connection with the additional brake cylinder or cylinders I provide means for obtaining a gradual reduction of the pressure therein after the brakes are applied, whereby the force of the application of the brakes so far as it is due to the pressure in the additional cylinder or cylinders is gradually reduced.

Figure 2:
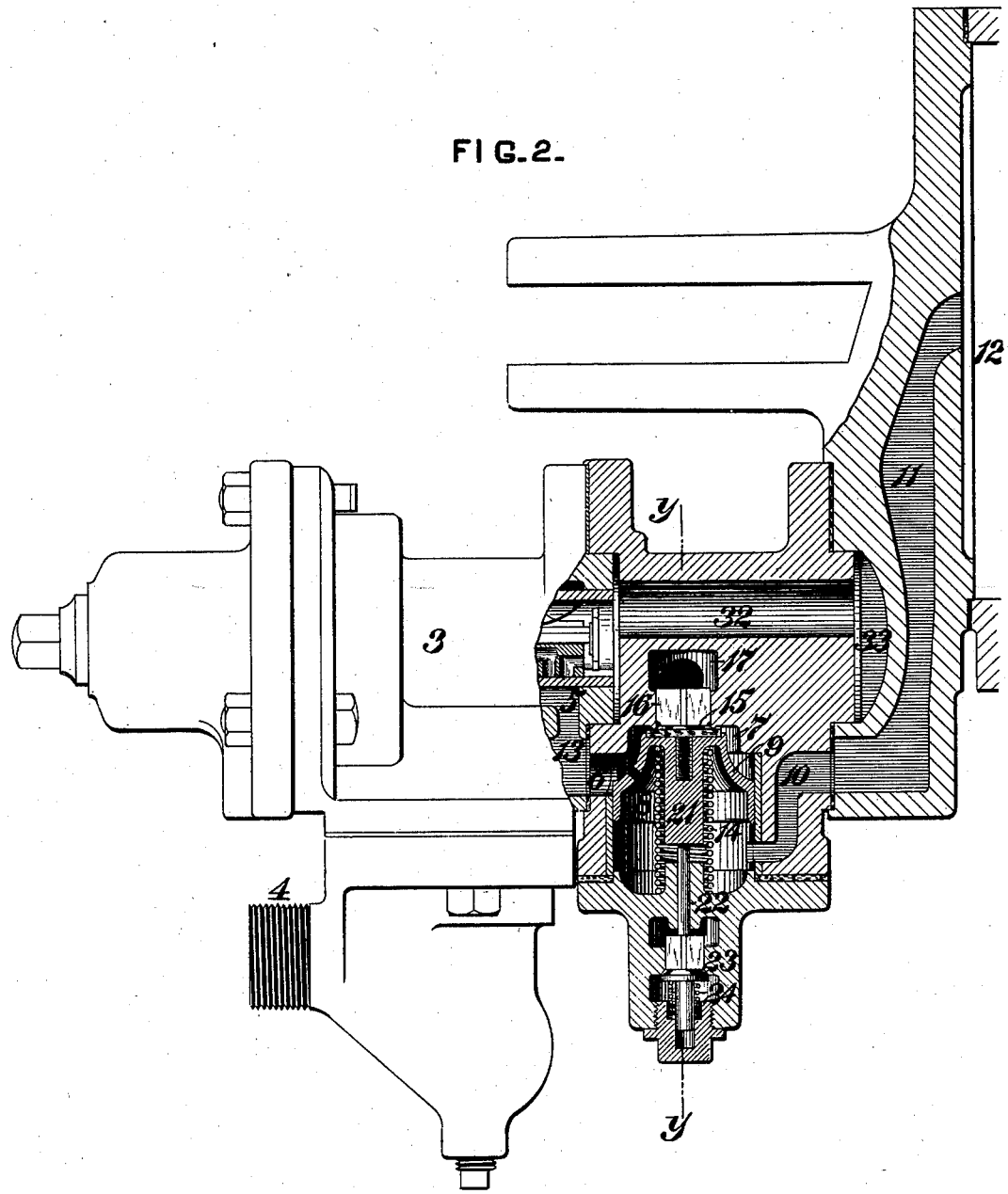
Figure 3:
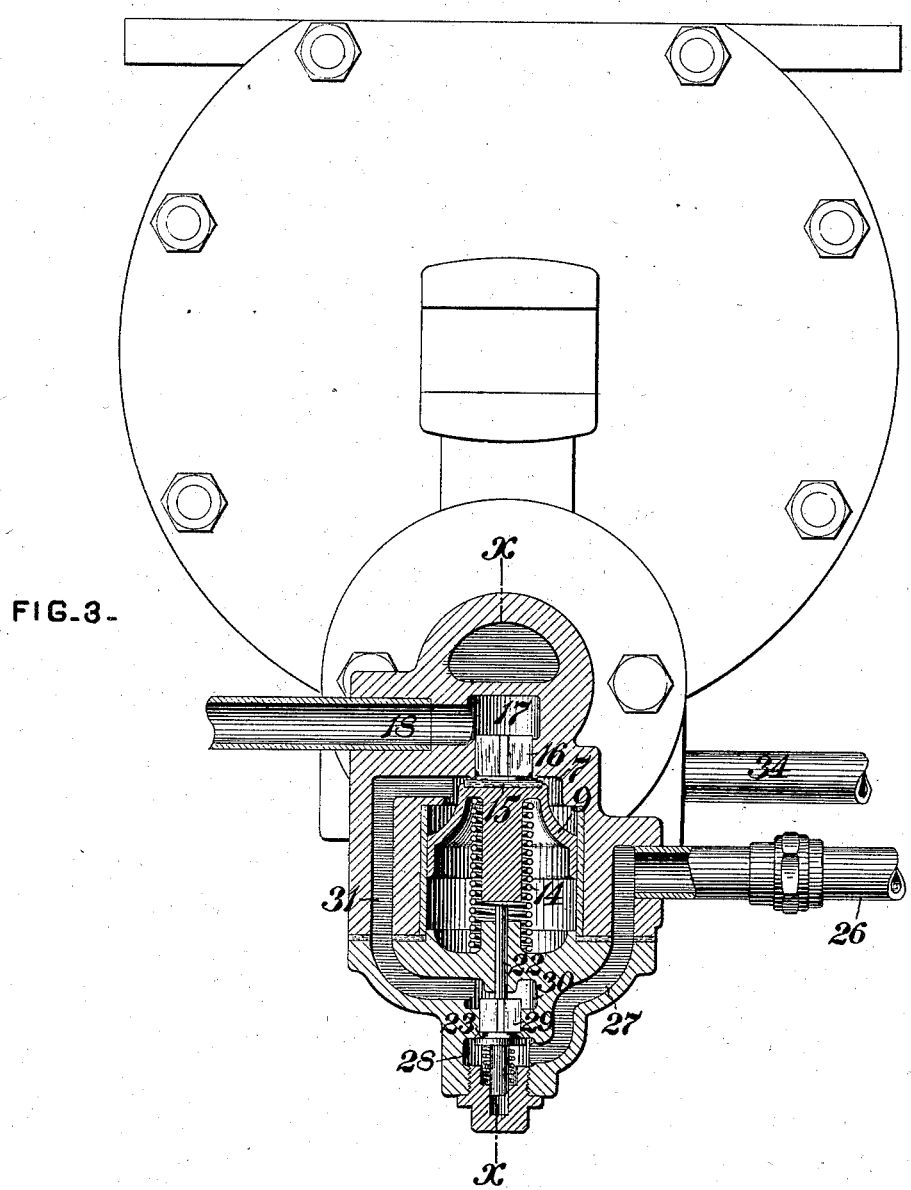
Figure 4:
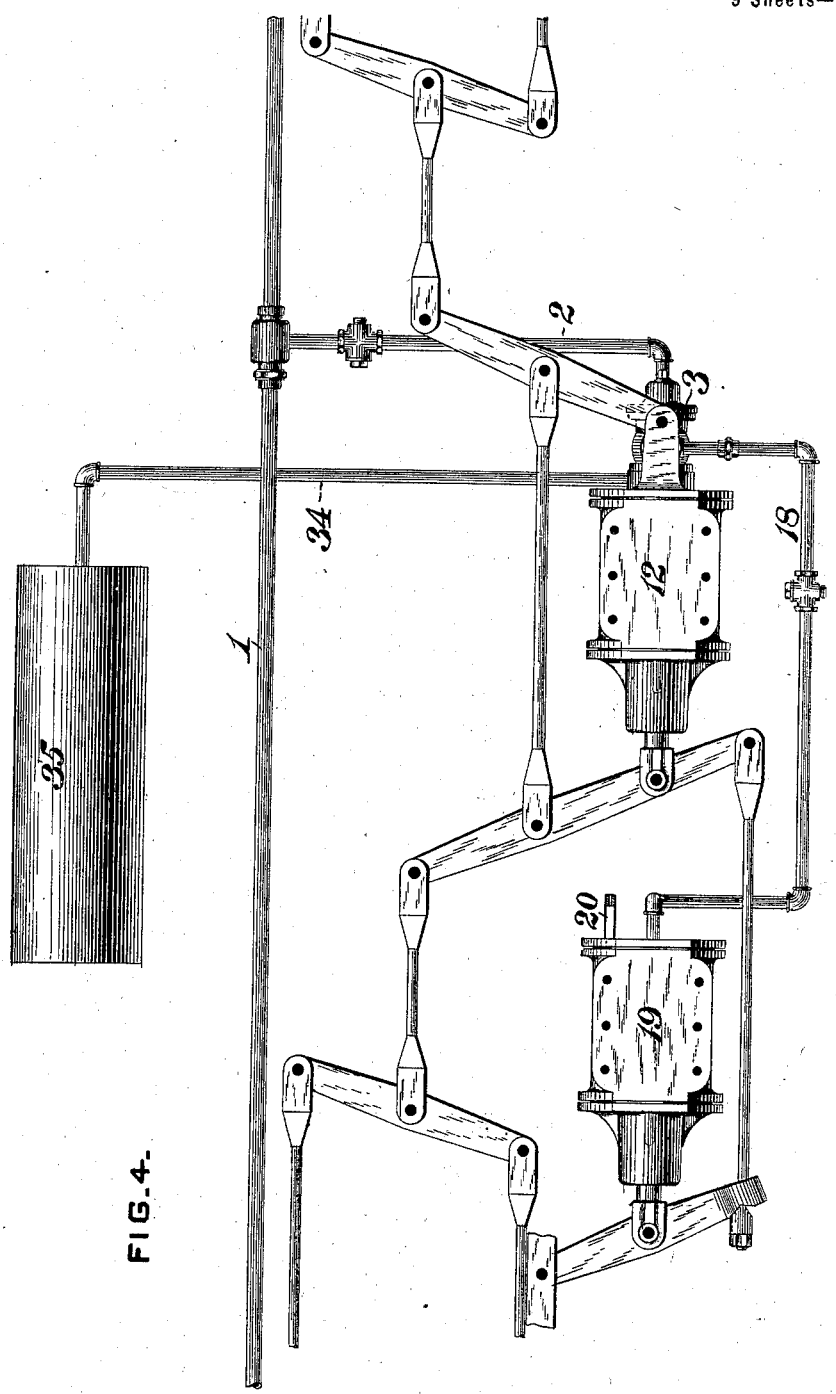
Figure 5:
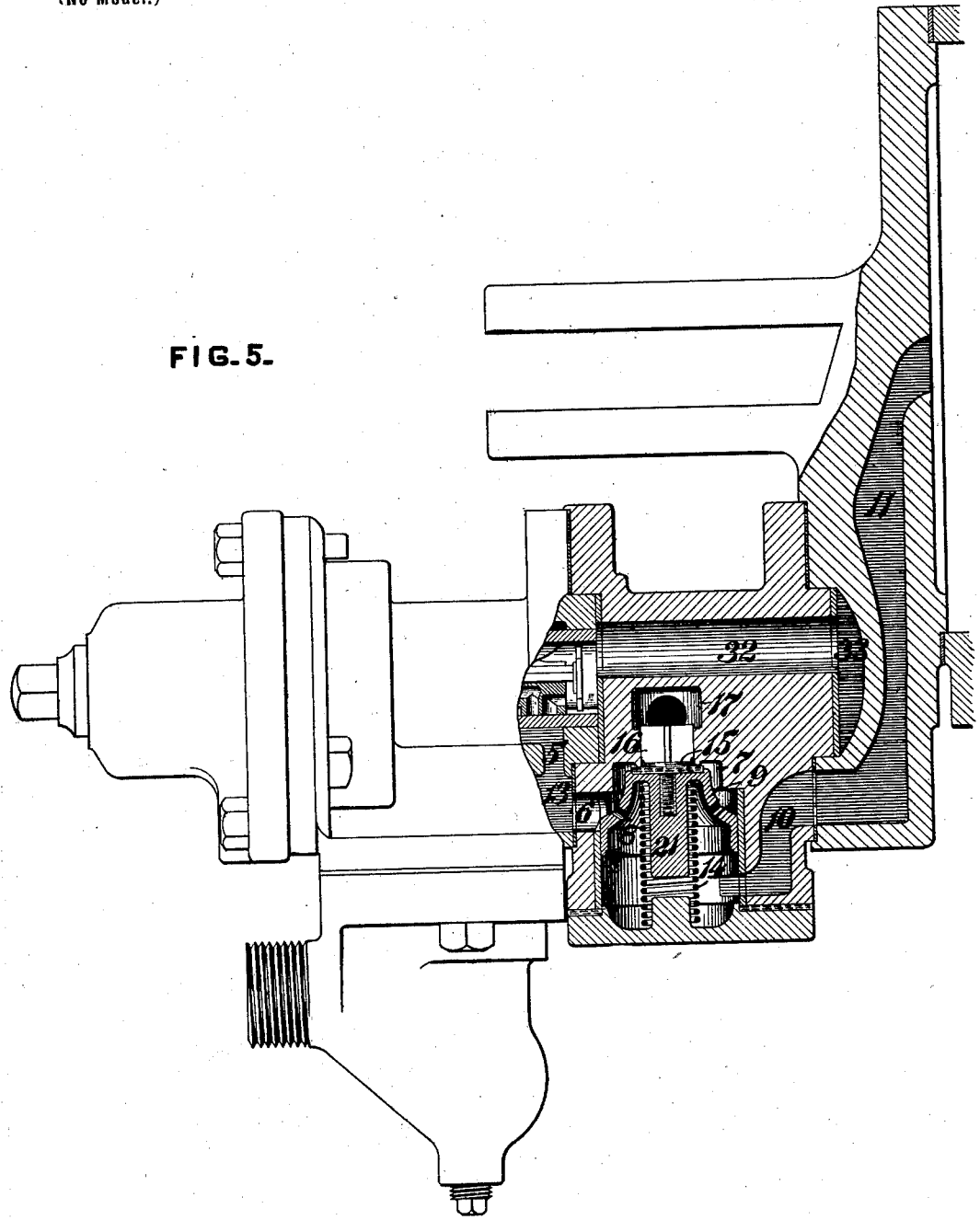
Figure 6:
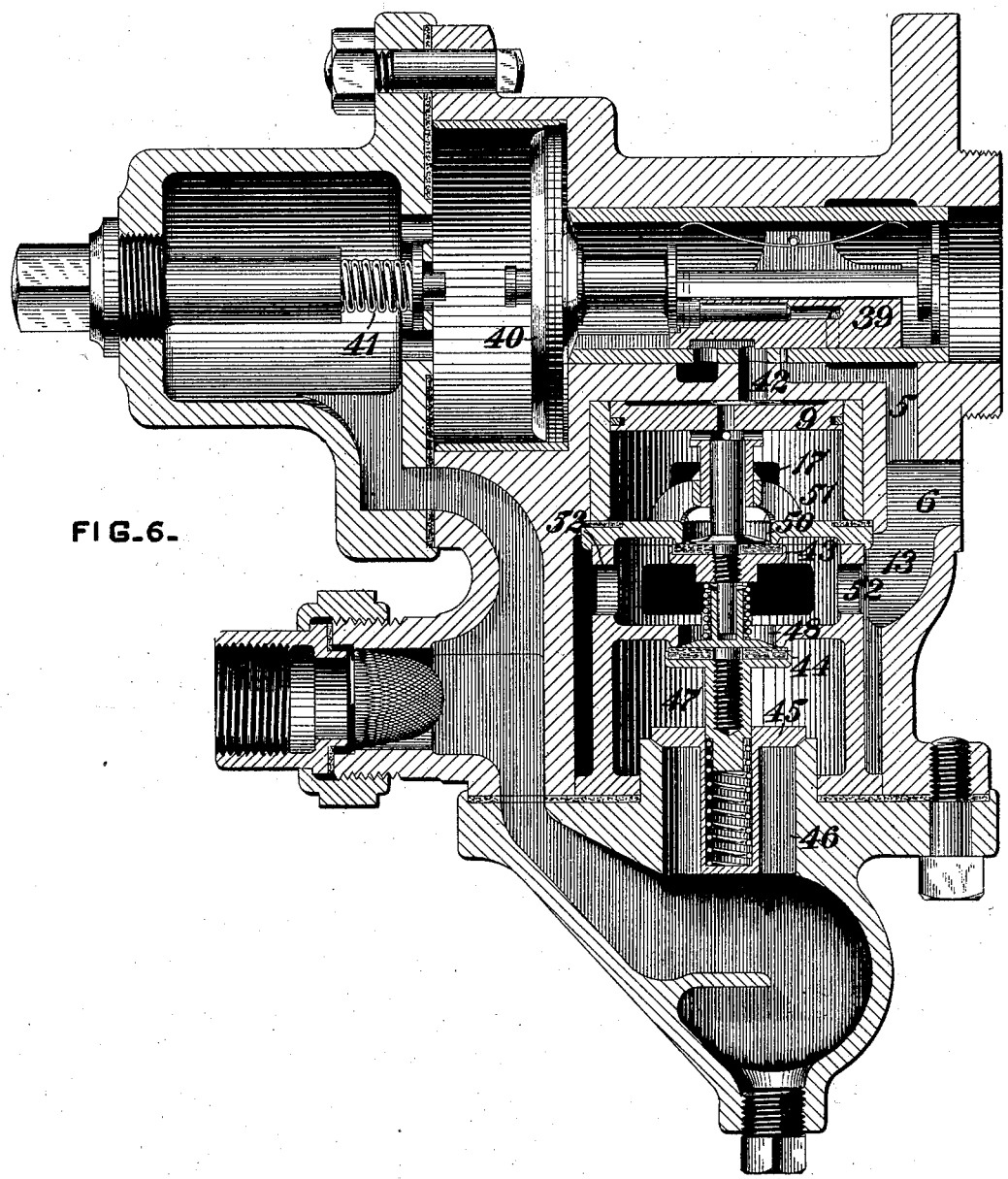

In the accompanying drawings, Figure 1 is a general plan view of one form of an apparatus adapted to the practice of my invention as arranged on a car; Fig. 2, a central longitudinal section on the line x x of Fig. 3 through a portion of a brake-cylinder and of an extra-service valve by which the extra application of power is controlled, a portion of the triple valve to which it is joined being also shown in section; Fig. 3, a vertical transverse section through the extra-service valve on the line y y of Fig. 2; Fig. 4, a general plan view of a modified arrangement of the apparatus in which but one auxiliary reservoir is employed. Figs. 5, 6, and 7 show in central longitudinal section extra-service-valve devices adapted for use with a single reservoir under each car. Figs. 8 and 9 are sectional views in planes at right angles one to the other of a modified form of extra-service-valve device in which a slide-valve controls the passage to the second cylinder, and Fig. 10 is a central section through the valve controlling communication between the auxiliary and supplemental reservoirs.

As shown in Figs. 1, 2, and 3, the train-pipe 1 is connected, as usual in the Westinghouse automatic air-brake system, through an engineer's brake-valve on the locomotive with a main reservoir and extends throughout the train. Under each car the train-pipe 1 is connected, by means of a branch pipe 2, to the nozzle 4 of the triple valve 3. The fluid under pressure passes around the triple-valve piston (which is not shown in Figs. 2 and 3) and through the passages 32, 33, and pipe 34 to the auxiliary reservoirs 35, and when the proper maximum pressure is reached in the auxiliary reservoir 35 the fluid passes through the pipe 37 and valve 38 into the supplemental reservoir 36.

The triple valve 3 (shown in Fig. 2) is an automatic quick-action triple valve of the type now generally employed in the Westinghouse automatic air-brake system. It is operated, as usual, by variations of pressure in the train-pipe to cause either service or emergency applications of the brakes. It will be obvious that any other suitable and preferred form of triple valve may be employed to perform the function of that selected for illustration.

In making a service application of the brakes a comparatively gradual reduction of pressure in the train-pipe causes the movement of the triple-valve piston and slide-valve and the opening of the graduating-valve which permits a moderate flow of fluid from the auxiliary reservoir through the passages 5 and 6 into the chamber 7 and through the passage or passages 8 in the extra-service piston 9 to the under side of said piston and thence through the passages 10 and 11 to the brake-cylinder 12. The passage or passages 8 are so proportioned as to permit a sufficiently-free flow of air from the auxiliary reservoir to the brake-cylinder, to avoid any interference in service application with the control of such flow by the triple valve, and to avoid any movement of the extra-service piston 9.

In making an emergency application of the brake a sudden and sufficiently-great reduction of train-pipe pressure causes such a movement of the triple-valve piston and slide-valve as is necessary to open the emergency-ports from the auxiliary reservoir and from the train-pipes, and fluid under pressure then flows in greater quantity and under higher pressure through the passages 5, 13, and 6 into the chamber 7 above the extra-service piston 9. The passage or passages 8 are not sufficiently large to permit such a free passage for the fluid as will prevent an accumulation of pressure above the piston 9 or to permit a rapid equalization of pressure on the two sides of the piston 9, and consequently said piston is forced down against the resistance of the spring 14 and opens the valve 15, which permits the fluid under pressure to flow from the auxiliary reservoir and train-pipe through the passages 16, 17, and 18 to the second brake-cylinder 19.

When the piston 9 is moved so as to unseat the valve 15, its stem 21 abuts against the stem 22 and unseats the valve 23, which is normally held seated by the spring 24. Fluid under pressure then flows from the supplementary reservoir 36 through the pipe 26, passages 27, 28, 29, 30, and 31 to the chamber 7 above the piston 9, and thence through the passages 16, 17, and 18 to the brake-cylinder 19. At the same time that fluid is being admitted to the second brake-cylinder through the passage 16 it is also flowing through the passage or passages 8 in the piston 9 into the brake-cylinder 12, and when sufficient pressure is accumulated below the piston 9 to permit said pressure, together with the pressure of the spring 14, to overcome the pressure above the piston 9 the valve 15 closes. In actual practice both cylinders are charged instantaneously to their maximum pressure, and the brakes are applied with their greatest force. This force is much greater than has been heretofore employed, and it is specially intended to be brought into operation only when the train has a very high speed and to be gradually reduced as the speed of the train slackens in order to prevent sliding of the wheels.

In order to provide for a gradual diminution of the force with which the brakes are applied when the pressure acts in both cylinders, I provide an outlet-passage 20 on the second cylinder, which is of such capacity that it permits at first an accumulation of pressure in the cylinder, which pressure acts on the wheels when they are turning at their greatest speed and thereafter gradually reduces the pressure by allowing the fluid to escape to the atmosphere as the speed of the wheels decreases. In practice this reduction of pressure is so graduated as to correspond as nearly as possible to the reduction in the speed of the train in such a manner as to permit the application of the greatest possible force to the wheels at the different speeds without preventing them from turning.

As shown in Fig. 1, the outlet-passage 20 is a small leakage-passage opening directly to the atmosphere and of such size as to permit a sufficiently-rapid reduction of pressure in the cylinder 19 to avoid sliding the wheels without permitting too sudden a reduction of pressure.

The exhaust of pressure from the cylinder 19 may be controlled by means of a governing device operated from the wheel or axle of a car in such a manner that the opening or closing of the passage 20 and the amount of the opening shall be regulated according to the speed at which the wheels are turning. With such a controlling means the passage 20 will be kept closed and the full pressure retained in the cylinder 19 as long as the wheels continue to revolve at or above a given speed, and as the speed with which the wheels revolve decreases the size of the opening through which the fluid is permitted to escape will be increased. A device of such character for controlling the pressure in the brake-cylinder is shown in Patent No. 218,149, granted to George Westinghouse, Jr., August 5, 1879, and it is to a device such as therein described, and especially the form shown in Figs. 2 and 5, that I have reference, the centrifugal governor of such device to be connected to the pipe or passage 20, as it is shown connected in said patent to the pipe C.

The passage 20 may be controlled by a device of such character as that shown and described in Patent No. 214,337, granted to George Westinghouse, Jr., April 15, 1879, in which the pressure in the brake-cylinder is regulated in accordance with the drag on the brake-shoe.

When a supplemental reservoir is employed, I prefer to so connect it with the auxiliary reservoir as to avoid any interference with the proper charging of the latter. To this end I employ a valve 38, (shown in Figs. 1 and 10,) through which fluid passes from the auxiliary reservoir 35 to the supplemental reservoir 36, said valve being so constructed as to permit the passage of fluid in one direction only and to remain closed until the maximum pressure has been obtained in the auxiliary reservoir 35. The fluid from the reservoir 35 then enters the chamber 53 through the pipe 37, and acting on the lower side of the diaphragm 54 overcomes the resistance of the spring 55, unseats the valve 56, and flowing through the passage 57 unseats the valve 58, flows through the chamber 59 and passages 60 and 61, and enters the reservoir 36.

In case the brake-cylinder 19 should be charged to a higher pressure than the cylinder 12 I provide a pipe or passage 62, (shown in dotted lines in Fig. 1,) through which fluid may pass from the cylinder 19 to the cylinder 12. A check-valve 79 is placed in the pipe or passage 62 to prevent the passage of fluid in the opposite direction—that is, from the cylinder 12 to the cylinder 19—so that after the pressure has been released from the cylinder 19 through the passage 20 the full pressure may be retained in the brake-cylinder 12. I have also shown in Fig. 1 a valve 78, placed in the pipe 18 between the two cylinders 12 and 19 for the purpose of cutting off the communication to the brake-cylinder 19 in case it is desirable so to do.

Fig. 4 shows a general plan of my improved apparatus as arranged for operation with a single reservoir under each car; and Figs. 5, 6, and 7 illustrate modifications of the valve mechanism, either of which may be employed in the practice of my invention and which are specially adapted for use with a single reservoir under each car.

In Fig. 5 the extra-service valve 15, piston 9, with its passage or passages 8, and spring 14 are similar to the corresponding parts in Figs. 2 and 3, and inasmuch as only the usual auxiliary reservoir is employed the pipe 26, passages 27, 28, 29, 30, and 31, and the valve 23 are omitted. When a service application of the brakes is made, the passage or passages 8 are large enough, as in Figs. 2 and 3, to permit a sufficiently free passage of the fluid to prevent such an accumulation of pressure above the piston as would cause the downward movement of the piston and the opening of the valve 15. In making an emergency application the piston is moved down and the valve 15 opened, as in the construction shown in Figs. 2 and 3, and the fluid from the auxiliary reservoir and from the train-pipe flows through the passages 5, 13, and 6 into the chamber 7 and thence through the passages 16, 17, and 18 into the brake-cylinder 19. At the same time fluid from the train-pipe and auxiliary reservoir also flows through the passage or passages 8 and passages 10 and 11 into the brake-cylinder 12.

Fig. 6 shows a modification in which the piston 9 is moved by fluid-pressure from the auxiliary reservoir when, in making emergency applications, the piston 40 of the triple valve is moved far enough to compress the spring 41 and to cause the slide-valve 39 to admit fluid from the auxiliary reservoir through the passage 42 to the piston 9. The piston 9 is then moved downwardly, unseating the valves 43 and 44. The train-pipe pressure lifts the valve 45, and fluid from the train-pipe flows through the passage 46, chamber 47, passage 48, chamber 49, passage 50, chamber 51, passage 17, and pipe 18 to the brake-cylinder 19. At the same time fluid flows into the brake-cylinder 12 through the passages 5 and 6 from the auxiliary reservoir and through the passages 52 from the train-pipe.

In the modification shown in Fig. 7 the piston 9 is actuated, as in the construction shown in Fig. 6, by pressure from the auxiliary reservoir when the slide-valve 39 has been moved to the emergency position by a quick reduction of train-pipe pressure. The valve 44 is then unseated and the valve 45 opened by train-pipe pressure, and the fluid from the train-pipe flows through the passage 46, chamber 47, passage 48, chamber 51, passage 17, and pipe 18 to the brake-cylinder 19. At the same time fluid from the auxiliary reservoir flows through the passages 5, 6, and 11 into the brake-cylinder 12.

These modifications of my invention, as shown in Figs. 6 and 7, form the subject-matter of my divisional application, Serial No. 100,949, filed April 1, 1902.

The construction shown in Figs. 8 and 9 is substantially similar to that shown in Figs. 2 and 3 and is adapted for operation with two reservoirs, the principal difference in construction being in the employment of a slide-valve 15 to control the passage to the second brake-cylinder instead of the form of valve shown for that purpose in Figs. 2 and 3.

The constructions shown in Figs. 2, 3, 8, and 9 may be employed in connection with the usual auxiliary reservoir only, the supplemental reservoir being omitted and a pipe connection being made from the usual auxiliary reservoir 35 to the passage 27, (shown in Figs. 3 and 9,) the connection being made at the point where the pipe 26 is shown in in those figures. This connection may be a separate direct connection from the auxiliary reservoir 35 to the passage 27, or it may be a branch connection from the pipe 34 to the passage 27. The operation of the extra-service valve device and its connection to the second brake-cylinder will then be substantially the same as with two reservoirs, but the pressures in the two brake-cylinders will be more nearly equalized.

In making ordinary service applications of the brake the piston of the brake-cylinder 12 and its piston-rod 63 are moved outwardly, and through the lever 64 they move the rod 65, lever 66, and rods 67 and 68 to apply the brake-shoes to the wheels at one end of the car, and the same movement of the lever 64 through the rod 69, lever 70, rod 71, and lever 72 applies the brake-shoes to the wheels at the opposite end of the car. During these service applications of the brakes as the extra-service valve is not brought into action and no fluid under pressure is admitted to the addditional cylinder 19 the piston and rod 73 of that cylinder remain stationary and do not assist in applying the brakes.

The lever 75, which is connected to and movable by the piston-rod 73, is pivoted at one end to a stationary pivot 76, and at the other end it is slotted to receive the rod 74, which is pivoted at one end to the lever 64, and at its other end has formed upon it a shoulder 77, which in the normal position—that is, with the brakes off—bears against one side of the lever 75.

When a service application of the brakes is made, the piston-rod 63, lever 64, and rod 74 are moved, but the piston-rod 73 and lever 75 remain stationary, and the rod 74 slides through the slot in the end of lever 75; but when fluid-pressure is admitted to both cylinders 12 and 19 and both piston-rods 63 and 73 are moved out the lever 64 and its connections operate as before, and the lever 75 also moves outwardly and by engaging with the shoulder 77 on the rod 74 exerts a pull on the rod 74 and lever 64, which is added to the force applied by the piston-rod 63 to the brake mechanism.

As the pressure in the cylinder 19 becomes sufficiently reduced to permit the return of the piston and rod of that cylinder before the pressure is released from the cylinder 12, the lever 75 is moved back to its normal position without moving the rod 74, and the brakes continue to be applied by the force exerted through the piston-rod 63 only.

The mechanical devices by means of which the piston-rods 63 and 64 cause the application of the brake-shoes form no part of my invention and are not claimed herein. Any other suitable means for that purpose may be substituted in the discretion of the constructor.

It will be seen that my improved method of controlling and applying braking power may be practiced with a great variety of constructions and automatic systems of fluid-pressure brakes and that its employment is not limited to automatic systems only or to the specific constructions shown in the drawings. It may be employed in direct brake systems—for example, with the construction of extra-service valve shown in Figs. 2, 3, 5, 8, and 9—and with the same connections from the extra-service valve to the two brake-cylinders, the triple valve and normally-charged train-pipe being omitted, a direct train-pipe may be connected to the main reservoir on the locomotive and lead to the passage 6, which opens into the chamber 7 above the piston 9. A gradual supply of pressure through the train-pipe to the upper side of the piston 9, so long as it is not sufficient to move said piston, will supply pressure through the passage or passages 8 to the brake-cylinder 12 only; but when a greater amount is suddenly supplied, so as to create a pressure above the piston 9 sufficient to compress the spring 14 and move the piston 9, the valve 15 will be unseated and the fluid will be admitted to the cylinder 19 as well as to the cylinder 12.

My invention is not limited to any particular means for releasing the pressure from the additional cylinder or cylinders or to a system in which said pressure is reduced or is released before the brakes are released. The passage or port 20 may therefore be omitted and the pressure in the second cylinder released through the pipe 62 from the cylinder 19 to the cylinder 12 when the pressure is being released in the usual way from the cylinder 12.

It is obvious that the valve device for admitting fluid to the additional brake cylinder or cylinders may be operated by various other means than those herein described, and my invention, therefore, is not limited to the particular construction shown, but also covers, broadly, any arrangement in which a valve device for admitting fluid to an additional brake-cylinder is operated when a rapid reduction of train-pipe air is made, as in an emergency application of the brakes.

I claim as my invention and desire to secure by Letters Patent—

1. In an automatic fluid-pressure brake mechanism, the combination, with a train-pipe, an auxiliary reservoir, and two brake-cylinders, of a valve device controlling the supply of fluid to one of the cylinders, and which is opened automatically by charging the other cylinder with greater rapidity than during a service application of the brakes, substantially as set forth.

2. In a fluid-pressure automatic brake mechanism, the combination, with an auxiliary reservoir, a plurality of brake-cylinders, and a train-pipe which is normally charged with fluid under pressure, of a valve device controlling the supply of fluid to one of the cylinders, and which is opened automatically by effecting an unusually rapid reduction of pressure in the fluid under pressure in the train-pipe by a positive release of a portion of the fluid under pressure in the train-pipe, substantially as set forth.

3. In an automatic fluid-pressure brake system, the combination, with a train-pipe, an auxiliary reservoir, and a series of two or more brake-cylinders, of means whereby fluid under pressure is gradually admitted to one of the brake-cylinders for service applications of the brakes, and a valve device which automatically admits fluid under pressure to another brake-cylinder by effecting a more rapid flow to the first cylinder than is necessary for a service application of the brakes, whatever the degree of pressure in the train-pipe, substantially as set forth.

4. In an automatic fluid-pressure brake system, the combination, with a train-pipe, an auxiliary reservoir, and a plurality of brake-cylinders, of a triple valve for supplying fluid under pressure to one of the brake-cylinders in making service applications of the brakes, and a valve device, operated by the fluid which charges the brake-cylinder, for supplying fluid to another cylinder to apply the brakes with maximum force, substantially as set forth.

5. In a quick-action fluid-pressure railway-train brake, and in combination with the ports or passages by which train-pipe pressure is vented directly from a train-pipe to a brake-cylinder, a valve in the line of such ports or passages, intermediate between the emergency-valve and the brake-cylinder, adapted to be opened only by the excessive pressure employed in a quick-action operation, and when opened, opening a port or passage which leads from another source of compressed air, substantially as set forth.

6. In a fluid-pressure brake apparatus an extra-service valve in a chamber on the delivery side of a source of supply, and in the line of the flow thereof, and suitable mechanism for varying the supply or charging pressure, in combination with air ports or passages leading thence to two brake-cylinders, one of which shall be open at low pressure, and both at high pressure.

7. In a fluid-pressure automatic brake mechanism, in which applications of the brakes may be effected by varying the pressures in the train-pipe between certain limits above the pressure of the atmosphere, the combination with a train-pipe, an auxiliary reservoir, and a plurality of brake-cylinders, of means whereby fluid under pressure is admitted to one of the brake-cylinders on a moderate or gradual reduction of the train-pipe pressure, and a valve device which admits fluid under pressure to another brake-cylinder on a more rapid reduction of train-pipe pressure, substantially as set forth.

8. In an automatic fluid-pressure brake mechanism, the combination, with a train-pipe, an auxiliary reservoir, and a plurality of brake-cylinders, of valve mechanism, operated by a partial reduction of train-pipe pressure, for automatically supplying fluid-pressure to one or more of the brake-cylinders, according to the rapidity of the variations in train-pipe pressure between certain limits above the atmosphere, substantially as set forth.

9. In an automatic fluid-pressure brake system, the combination, with a train-pipe, an auxiliary reservoir, and a plurality of brake-cylinders of a triple valve operated by gradual variations of train-pipe pressure to supply fluid under pressure to one of the brake-cylinders, and an extra-service valve, which is brought into action by fluid under pressure in making a more rapid reduction of train-pipe pressure between certain limits above the atmospheric pressure, whereby fluid-pressure is supplied simultaneously to more than one of the brake-cylinders under each car, substantially as set forth.

10. In a fluid-pressure automatic brake mechanism the combination, with a train-pipe, an auxiliary reservoir, and a plurality of brake-cylinders, of means whereby fluid under pressure is admitted to one of the brake-cylinders on a moderate or gradual reduction of the train-pipe pressure, and a valve device which admits fluid under pressure to another brake-cylinder on a more rapid but partial reduction of train-pipe pressure, substantially as set forth.

11. In an automatic fluid-pressure brake mechanism, the combination, with a train-pipe, an auxiliary reservoir, and a plurality of brake-cylinders, of valve mechanism for automatically supplying fluid-pressure to one or more of the brake-cylinders according to the rapidity of the variations in train-pipe pressure, between certain limits above the pressure of the atmosphere, substantially as set forth.

12. In an automatic fluid-pressure brake system, the combination, with a train-pipe, an auxiliary reservoir, and a plurality of brake-cylinders, of a triple valve operated by gradual variations of train-pipe pressure to supply fluid under pressure to one of the brake-cylinders, and an extra-service valve which is brought into action by making a more rapid reduction of train-pipe pressure between certain limits above the atmospheric pressure, whereby fluid-pressure is supplied simultaneously to more than one of the brake-cylinders under each car, substantially as set forth.

13. In an automatic fluid-pressure brake mechanism, the combination, with a train-pipe, an auxiliary reservoir, and two brake-cylinders, of means for admitting fluid under pressure to both cylinders by a partial release of fluid under pressure from the train-pipe, whereby the charging of one cylinder only may be effected by a moderate or gradual reduction of train-pipe pressure, and the charging of the other cylinder by a rapid reduction of train-pipe pressure, substantially as set forth.

In testimony whereof I have hereunto set my hand.

HENRY HERMAN WESTINGHOUSE.

Witnesses:
 JOHN F. MILLER,
 T. J. HOGAN.